United States Patent
Nakata et al.

(10) Patent No.: US 9,536,343 B2
(45) Date of Patent: Jan. 3, 2017

(54) THREE-DIMENSIONAL IMAGE GENERATION APPARATUS AND THREE-DIMENSIONAL IMAGE GENERATION METHOD

(71) Applicant: DENSO CORPORATION, Kariya, Aichi-pref. (JP)

(72) Inventors: Kazuyuki Nakata, Ama (JP); Kentarou Kajita, Nagoya (JP); Soju Matsumoto, Yokohama (JP); Takumi Ishikawa, Yokohama (JP); Yusuke Inoue, Yokohama (JP); Matteo Salardi, Yokohama (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 14/646,906

(22) PCT Filed: Nov. 5, 2013

(86) PCT No.: PCT/JP2013/006514
§ 371 (c)(1),
(2) Date: May 22, 2015

(87) PCT Pub. No.: WO2014/083776
PCT Pub. Date: Jun. 5, 2014

(65) Prior Publication Data
US 2015/0325034 A1    Nov. 12, 2015

(30) Foreign Application Priority Data

Nov. 30, 2012 (JP) ................................ 2012-262679
Jul. 17, 2013 (JP) ................................ 2013-148510

(51) Int. Cl.
*G06T 15/00* (2011.01)

(52) U.S. Cl.
CPC .................................. *G06T 15/005* (2013.01)

(58) Field of Classification Search
CPC ............ G06T 2219/028; G06T 17/005; G06T 11/203; G06T 13/20; G06T 13/40; G06T 15/005; G06T 17/05; G06T 2207/10028; G06T 2207/10081; G06T 2207/10088; G06T 2207/10116; G06T 2207/30036; G06T 2219/2008; G06T 7/0024; G06T 9/001; G06F 17/5018; G06F 17/50; G06F 19/3437; G06F 19/327; G06F 17/5009; G06F 17/5095; G06F 2217/16; G06F 2217/41; G06F 17/13; G06F 2217/06; G06F 9/4881
See application file for complete search history.

(56) References Cited

U.S. PATENT DOCUMENTS

| 8,797,337 | B1 * | 8/2014 | Labour | ................... | G06F 21/53 |
| | | | | | 345/501 |
| 2001/0035873 | A1 * | 11/2001 | Easter | ..................... | G06T 17/00 |
| | | | | | 345/632 |

(Continued)

FOREIGN PATENT DOCUMENTS

JP    2007-334739 A    12/2007

OTHER PUBLICATIONS

International Search Report and Written Opinion of the International Searching Authority mailed Dec. 10, 2013 in the corresponding International application No. PCT/JP2013/006514 (and English translation).

(Continued)

*Primary Examiner* — Sultana M Zalalee
(74) *Attorney, Agent, or Firm* — Posz Law Group, PLC

(57) ABSTRACT

In a three-dimensional image generation apparatus, a CPU concatenates meshes of a plurality of objects which meet a predefined concatenation condition, and performs in advance vertex attribute transformation on the plurality of (Continued)

objects of which the meshes have been concatenated. The CPU regards as a single object, the plurality of objects on which the vertex attribute transformation has been performed, and transfers a rendering command, which instructs rendering of the plurality of objects regarded as the single object, to a GPU. The GPU renders, at a time, the plurality of objects that are regarded as the single object, upon receiving the rendering command from the CPU.

4 Claims, 13 Drawing Sheets

(56) References Cited

U.S. PATENT DOCUMENTS

| | | | |
|---|---|---|---|
| 2008/0094411 A1* | 4/2008 | Parenteau | G06T 15/503 345/592 |
| 2009/0002376 A1* | 1/2009 | Xu | G06T 13/40 345/473 |
| 2010/0283787 A1* | 11/2010 | Hamedi | G06T 17/005 345/473 |
| 2012/0158369 A1* | 6/2012 | Bachrach | G06F 17/50 703/1 |
| 2012/0162372 A1* | 6/2012 | Ghyme | H04N 13/004 348/46 |

OTHER PUBLICATIONS

Jason Gregory, "Game Engine Architecture", First edition, SoftBank Creative Corp., Dec. 1, 2010, pp. 459-465 (in English).

\* cited by examiner

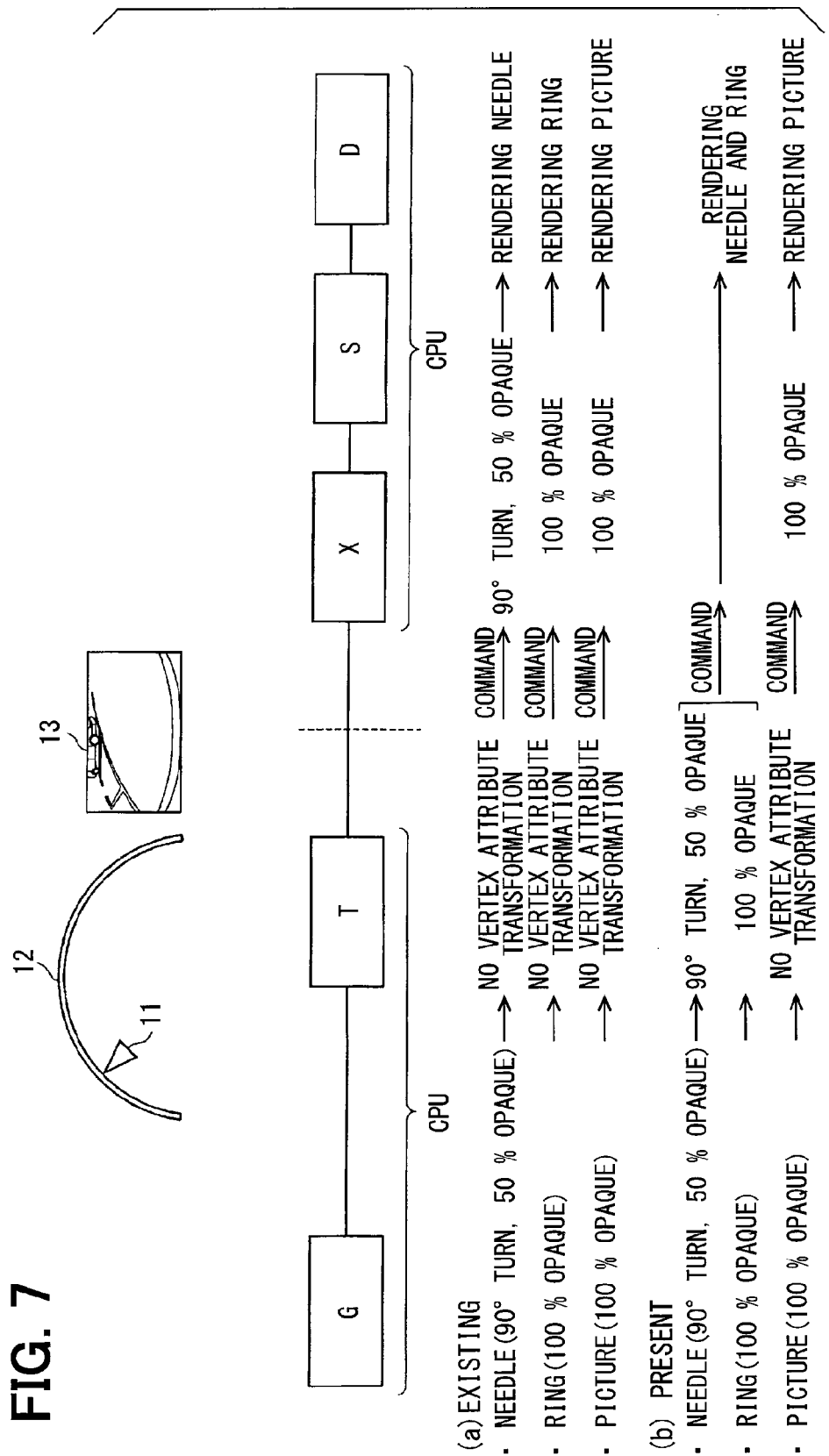

FIG. 12

Result of object reduction

| Function | Before | After |
| --- | --- | --- |
| Telltales | 17 | 1 |
| Speedometer, tachometer and odometer | 40 | 1 |
| Lane guidance | 16 | 1 |
| Turn by turn | 16 | 1 |
| TAB menu | 8 | 1 |
| Fuel and temperature gauge | 8 | 1 |
| Driving assistance system | 6 | 1 |
| Turn list | 12 | 1 |
| Total | 123 | 8 |

FIG. 13

Result of the processing time

|  | Before | After | Improvement |
| --- | --- | --- | --- |
| CPU load (ms) | 64.0 | 30.5 | 33.5 |
| GPU load (ms) | 22.5 | 22.5 | 0.0 |

THREE-DIMENSIONAL IMAGE GENERATION APPARATUS AND THREE-DIMENSIONAL IMAGE GENERATION METHOD

CROSS REFERENCE TO RELATED APPLICATION

The present application is a U.S. national stage of International Application No. PCT/JP2013/006514 filed on Nov. 5, 2014 and is based on Japanese Patent Applications No. 2012-262679 filed on Nov. 30, 2012 and No. 2013-148510 filed on Jul. 17, 2013, the disclosures of which are incorporated herein by reference.

TECHNICAL FIELD

The present disclosure relates to a three-dimensional image generation apparatus and a three-dimensional image generation method, in which a control unit transfers a rendering command to a rendering unit to perform vertex attribute transformation on an object instructed with the rendering command and render the object.

BACKGROUND ART

There is conventionally provided a technology of a three-dimensional computer graphics (hereinafter, 3DCG) that renders an object (virtual entity) which is managed in a virtual three-dimensional space, by projecting the object onto a screen plane of a computer through calculation. The 3DCG requires many arithmetic resources. Therefore, a series of processes relevant to rendering is not performed by a central processing unit (CPU) alone. Generally, a graphics processing unit (GPU) that is a dedicated hardware resource is included so that the CPU and GPU can collaborate to perform the series of processes relevant to rendering (refer to, for example, Patent Literature 1).

PRIOR ART LITERATURES

Patent Literature

Patent Literature 1: JP 2007-334739 A

SUMMARY OF INVENTION

Such 3DCG renders objects using a CPU transferring a rendering command to a GPU for each object. The GPU performs vertex attribute transformation on the object instructed with the rendering command, and renders the object on which the vertex attribute transformation has been performed. However, according to the technique of transferring the rendering command for each object, the increase in the number of objects (objects count) of rendering leads to not only the linear increase in a time the GPU spends for an overhead of a function call issued with the rendering command, but also to the decrease in the rendering speed.

For coping with the decrease in the rendering speed, a technology is available for concatenating as many objects as possible in a process of producing graphics data that serves as a fundament of a three-dimensional image. However, objects whose actions (behaviors) are identical to each other can be concatenated, but objects whose actions are different from each other cannot be concatenated. This limits the improvement of the decrease in the rendering speed. In addition, the process of producing graphics data gets complicated.

It is an object of the present disclosure to provide a three-dimensional image generation apparatus and a three-dimensional image generation method, which are each capable of raising a rendering speed without affecting a process of producing graphics data that is a fundament of a three-dimensional image.

To achieve the above object, an example of the present disclosure is provided as follows. A control unit transfers a rendering command which instructs rendering of an object constituting a three-dimensional image. Upon receiving the rendering command from the control unit, a rendering unit performs vertex attribute transformation on an object instructed with the rendering command and renders the object. Herein, a concatenation section concatenates meshes of a plurality of objects that meet a predefined concatenation condition. The control unit further performs in advance vertex attribute transformation on the plurality of objects (also referred to as a concatenated group) of which meshes are concatenated by the concatenation section, and transfers a rendering command. This rendering command instructs rendering of the plurality of objects (also referred to as a post-transformation concatenated group), on which the vertex attribute transformation has been performed, by regarding the plurality of objects as a single object. Upon receiving said rendering command from the control unit, the rendering unit renders, at a time, the plurality of objects that are regarded as the single object and instructed with said rendering command.

Unlike an existing technique of transferring a rendering command for each object, a control unit performs in advance vertex attribute transformation on a plurality of objects having meshes thereof concatenated, regards the plurality of objects, on which the vertex attribute transformation has been performed, as one object, and transfers the rendering command which instructs rendering of the object. This can suppress a time a rendering unit spends for an overhead of a function call issued with the rendering command, and raise a rendering speed. This does not need concatenate as many objects as possible in a process of producing graphics data that is a fundament of a three-dimensional image. Therefore, the process of producing graphics data will not be affected at all.

For example, suppose a ratio of an overhead time against an overall processing time; the overhead time is to be spent for an overhead of a function call issued with a rendering command, while the overall process time is to be spent for a series of processes relevant to rendering. In short, a relatively small ratio of the overhead time against the overall process time is exhibited by the rendering of an object having a relatively complex shape or a relatively large number of vertices. In contrast, a relatively large ratio of the overhead time against the overall process time is exhibited by the rendering of an object having a relatively simple shape or a relatively small number of vertices. The above example of the present disclosure can thus prove effective in rendering a large number of objects each having a relatively small number of vertices.

BRIEF DESCRIPTION OF DRAWINGS

The foregoing object of the present disclosure, another object thereof, and features and advantages thereof will be clarified with a description to be made below by referring to the appended drawings.

FIG. 7 is a diagram showing a form to concatenate meshes;

FIG. 12 is a diagram showing a form to classify objects into concatenation groups; and FIG. 13 is a diagram showing results of measurements of a process time.

EMBODIMENTS FOR CARRYING OUT INVENTION

Figure 1:
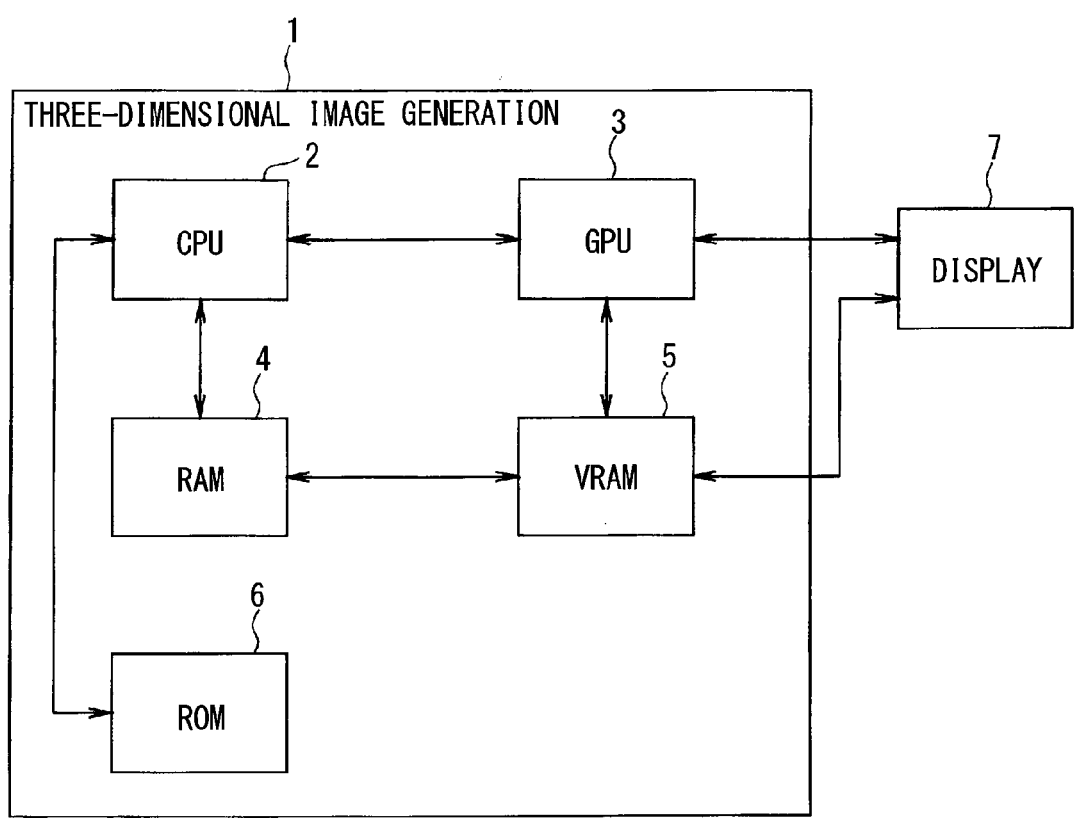
FIG. 1 is a functional block diagram showing an embodiment of the present disclosure.

Referring to the drawings, an embodiment of the present disclosure will be described below. A three-dimensional image generation apparatus 1 includes a central processing unit (CPU) 2 (control unit, device, or means), a graphics processing unit (GPU) 3 (rendering unit, device, or means), a random access memory (RAM) 4, a video RAM (VRAM) 5, and a read only memory (ROM) 6. The CPU 2 may be referred to as a concatenation section, unit, device, or means. In the present application, "Shudan" in Japanese may refer to a "device" or "means" in English.

The ROM 6 stores graphics data (three-dimensional model data). The graphics data is data that is a fundament of a three-dimensional image and includes a plurality of element data items constituting the three-dimensional image. The CPU 2 reads (fetches) the graphics data from the ROM 6, and constructs a scene graph in the RAM 4 based on the read graphics data. The scene graph has a tree structure having objects hierarchically classified into groups. Each of nodes of the scene graph contains information on a shape of an object, information on a surface attribute, and information concerning model conversion (position, posture, enlargement, or reduction). In the present applicant, "information" is used as an uncountable noun as well as a countable noun.

When employing graphics data stored in an external storage unit such as a hard disk unit or a CD ROM, the CPU 2 may construct a scene graph in the RAM 4 based on the graphics data read from the external storage unit. When employing the graphics data stored in a server on a network, the CPU 2 may construct the scene graph in the RAM 4 based on the graphics data downloaded from the server over a communication link. Part of the graphics data may be stored in the RAM 4. The CPU 2 may read the graphics data from the RAM 4 and construct the scene graph in the RAM 4 based on the read graphics data.

After constructing a scene graph in the RAM 4, the CPU 2 performs a traverse process, which will be described later, on the constructed scene graph. In the traverse process, the CPU 2 decides whether each of all objects belonging to the scene graph is included in a concatenation group (meets a concatenation condition) to be described later. For an object that is decided not to be included in the concatenation group, the CPU 2 transfers a rendering command, which instructs rendering of the object, to the GPU 3. In contrast, for a plurality of objects decided to be included in the concatenation group, the CPU 2 concatenates meshes of the plurality of objects included in the concatenation group, and performs in advance vertex attribute transformation on the plurality of objects whose meshes have been concatenated (prior to transfer of the rendering command). The CPU 2 transfers, to the GPU 3, a rendering command, which instructs rendering of a plurality of objects, on which the vertex attribute transformation has been performed, by regarding the plurality of objects as a single object.

Upon receiving the rendering command from the CPU 2, the GPU 3 performs a rendering process to be described later. In the rendering process, the GPU 3 decides whether the object instructed with the rendering command is an object on which vertex attribute transformation has been performed. The GPU 3 performs the vertex attribute transformation on the object instructed with the rendering command, and renders the object on which the vertex attribute transformation has been performed.

When rendering an object, the GPU 3 performs filling and image display. As the filling, the GPU 3 calculates a pixel value and brightness of each of pixels existent inside the vertices of an object projected onto a coordinate system on a two-dimensional screen, calculates a depth of each object, and stores the results of the calculations as image data in the VRAM 5. As the image display, the GPU 3 reads image data stored in the VRAM 5, and outputs the read image data as a video signal to a display unit 7. For example, if the three-dimensional image generation apparatus 1 is designed to be adapted to a vehicle, the display unit 7 displays a graphics meter. The graphics meter presents various information, such as an indicator, needle, dial, panel, lane, turn-by-turn (TBT). The information presented by the graphics meter include a large number of objects for targets of rendering. Each of the objects has a relatively simple shape, for example, a rectangle, and has a small number of vertices. A vehicle mounted with the three-dimensional image generation apparatus 1 may be referred to as a host vehicle or a subject vehicle.

Figure 2:
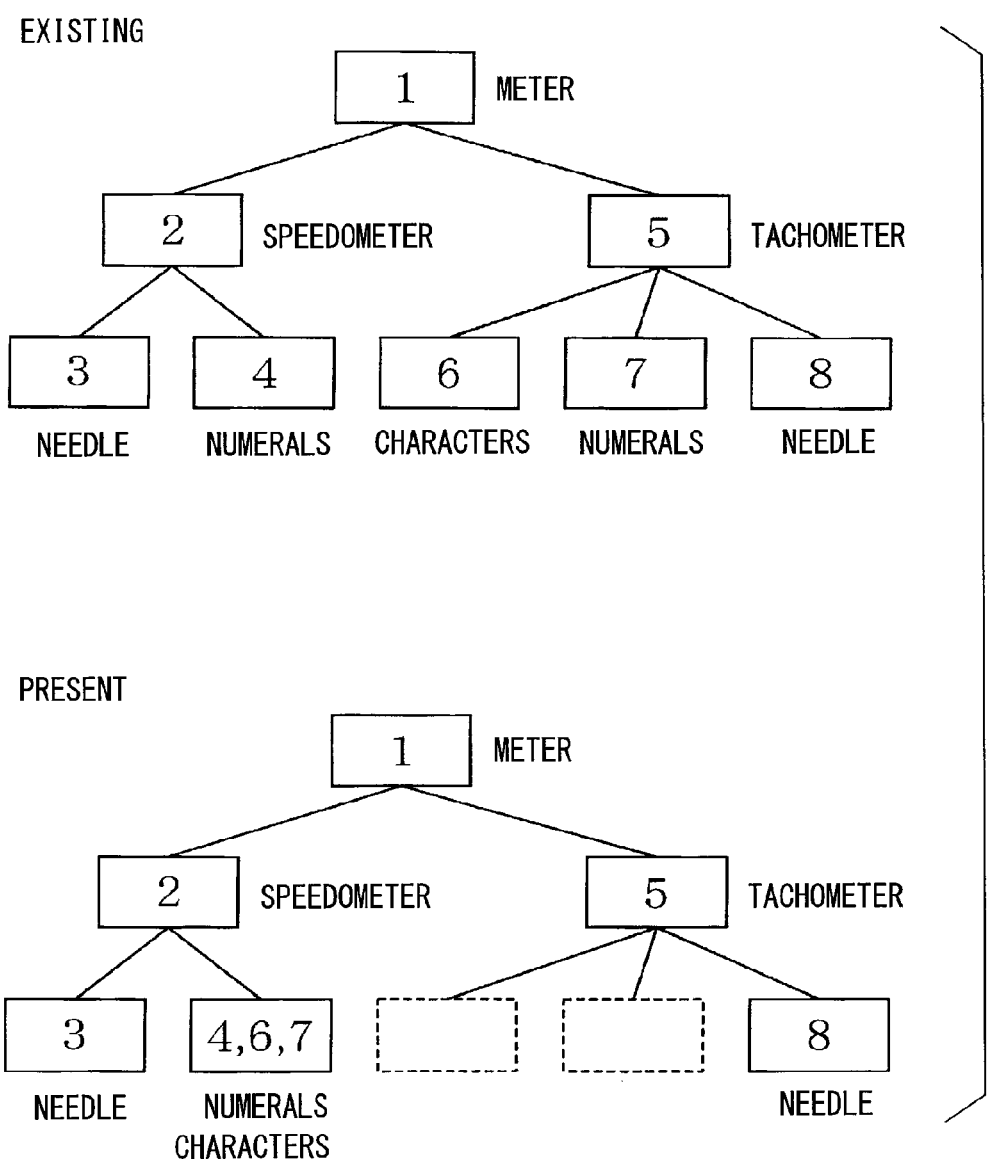
FIG. 2 is a diagram showing a structure of a scene graph.
Figure 3:
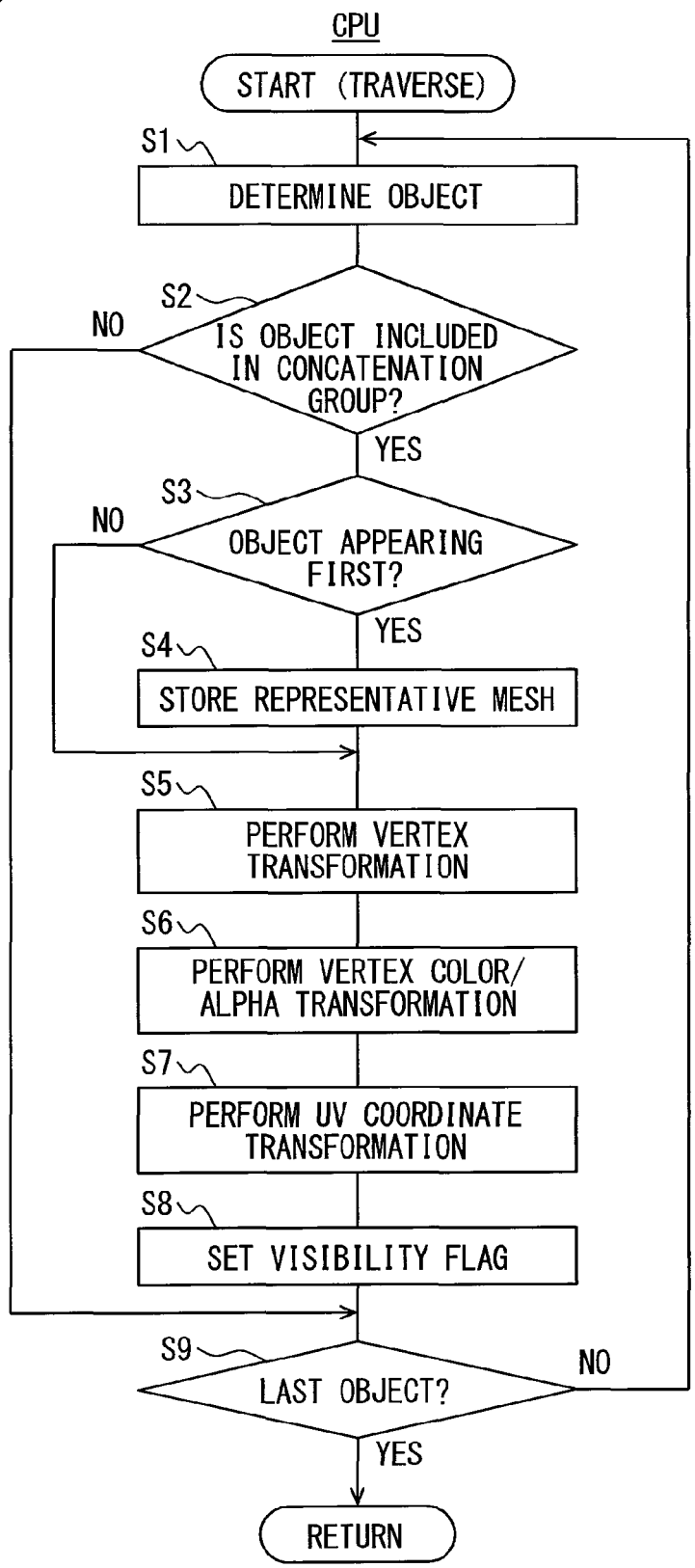
FIG. 3 is a flowchart describing a traverse process performed by a CPU.
Figure 4:
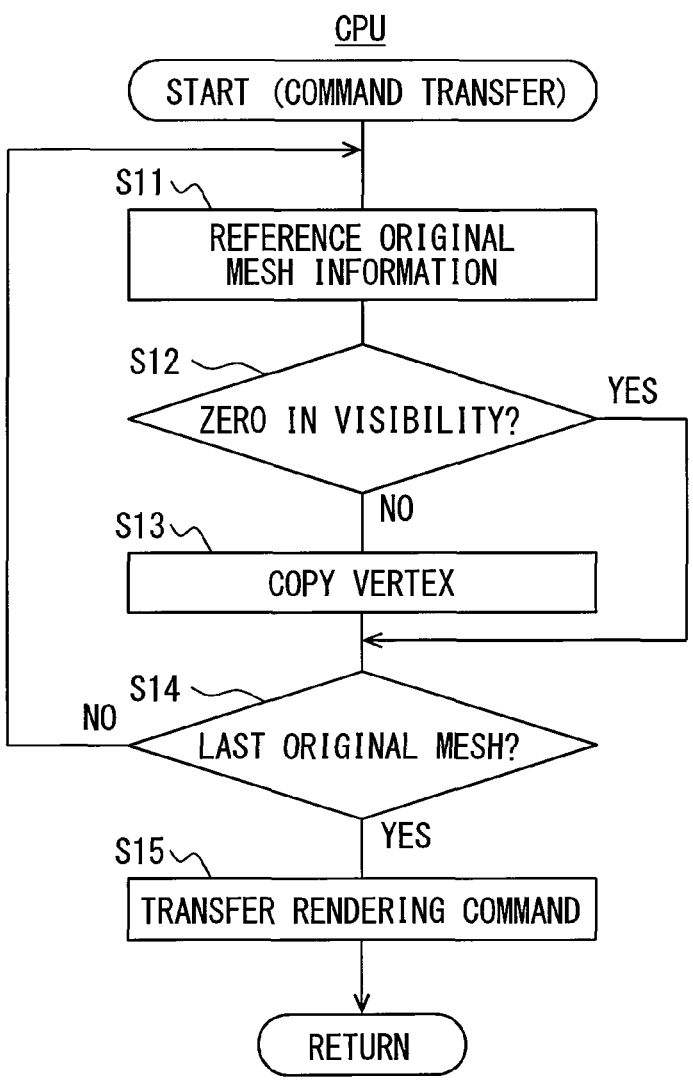
FIG. 4 is a flowchart describing a rendering command transfer process performed by the CPU.

FIG. 2 shows an example of a structure of a scene graph constructed in the RAM 4. FIG. 2 expresses a model of the aforesaid graphics meter including a speedometer and tachometer. The speedometer includes a needle and numerals; the tachometer includes characters, numerals, and a needle. According to an existing technique, the CPU 2 transmits a rendering command to the GPU 3 for each of the objects of a meter (1), speedometer (2), needle (3), numerals (4), tachometer (5), characters (6), numerals (7), and needle (8). Upon receiving sequentially the rendering commands which instruct rendering of the meter (1), speedometer (2), needle (3), numerals (4), tachometer (5), characters (6), numerals (7), and needle (8) respectively, the GPU 3 sequentially performs vertex attribute transformation on each of the objects, and sequentially renders each of the objects on which the vertex attribute transformation has been performed.

In contrast, according to a technique of the present embodiment, a concatenation condition is stipulated in advance, and the stipulated concatenation condition is stored in the CPU 2. The CPU 2 concatenates meshes of a plurality of objects that meet the concatenation condition, and performs vertex attribute transformation on each of the plurality of objects whose meshes are concatenated, in advance (prior to transfer of a rendering command). The CPU 2 regards the objects meeting the concatenation condition, for example, the numerals (4), characters (6), and numerals (7) as one part. If the meshes of the objects are concatenated, the CPU 2 performs vertex attribute transformation on each of the objects of which the meshes are concatenated. Thereafter, the CPU 2 regards the plurality of objects, on which the vertex attribute transformation has been performed, as a single object, and transfers a rendering command. Upon receiving sequentially the rendering commands which instruct rendering of the meter (1), speedometer (2), needle (3), tachometer (5), and needle (8), respectively, the GPU 3 sequentially performs the vertex attribute transformation on each of the objects, and sequentially renders each of the objects on which the vertex attribute transformation has been performed. In contrast, the GPU 3 further receives a rendering command instructing rendering of objects of the numerals and characters (4, 6, and 7) that are regarded as a single part. Those objects have been already subjected by the CPU 2 to the vertex attribute transformation; thus, the GPU 3 proceeds to rendering without performing any vertex attribute transformation. The technique of the present embodiment is different from the existing technique of transferring a rendering command for each of objects in that: vertex attribute transformation is performed in advance on each of a plurality of subject objects whose meshes are concatenated; and a rendering command is transferred which instructs rendering of the plurality of subject objects on which the vertex attribute transformation has been performed by regarding the plurality of subject objects as a single object. Compared with the existing technique of transferring the rendering command for each of objects, the time the rendering unit spends for an overhead of a function call issued with a rendering command can be suppressed more greatly, and a rendering speed can be raised more greatly (refer to FIG. 8 to be described later).

The following will describe a concatenation condition under which meshes of objects are concatenated.

(1) Objects referencing the same material (texture) are classified into the same concatenation group. What is referred to as the texture is the setting of the material of an object face such as a color, transparency, reflectance, refractive index, irregularity. More particularly, the texture refers to a metallic (metal-like) material, glassy (glass-like) material, or woody (grainy) material.

(2) One object belongs to a single concatenation group.

Referring to FIG. 3 to FIG. 13, the following will describe an operation of the foregoing configuration.

It is noted that a flowchart or the processing of the flowchart in the present application includes sections (also referred to as steps), each of which is represented, for instance, as S1 or T1. Further, each section can be divided into several sub-sections while several sections can be combined into a single section. Furthermore, each of thus configured sections can be also referred to as a device, module, means, or unit.

According to the technique of the present embodiment, the CPU 2 performs a traverse process and a rendering command transfer process, while the GPU 3 performs a rendering process. The traverse process includes a concatenation section/step and a vertex attribute transformation section/step. The rendering command transfer process includes a rendering command transfer section/step. The rendering process includes a rendering section/step.

After initiating the traverse process, the CPU 2 determines an object of a traverse destination (S1). Thereafter, the CPU 2 determines whether the object of the traverse destination is an object included in a concatenation group meeting a predefined concatenation condition (a condition that the same material is referenced) (S2). If the CPU 2 decides that the mesh of the object meets the predefined concatenation condition and the object is the object included in the concatenation group (S2: YES), the CPU 2 decides whether the object is an object that appears first within the concatenation group (S3).

If the CPU 2 decides that the object is an object that appears first within the concatenation group (S3: YES), a representative mesh of the concatenation group is stored in a target-of-rendering mesh array (S4), and performs vertex attribute transformation (S5 to S7). In contrast, even if the CPU 2 decides that the object is not the object that appears first within the concatenation group (object that appears secondly or later) (S3: NO), the CPU 2 performs the vertex attribute transformation (S5 to S7). The CPU 2 performs the vertex attribute transformation that includes: vertex transformation; vertex color/alpha transformation; and UV coordinate transformation. The vertex transformation is a process of transforming coordinate data of a vertex by moving, enlarging, reducing, or turning. The vertex color/alpha transformation is a process of performing transformation by reflecting a color or transparency on an object. The UV coordinate transformation is a process of performing transformation by associating a position of an image with a vertex in a plane in a three-dimensional space for bonding the image to the plane.

Figure 6A:
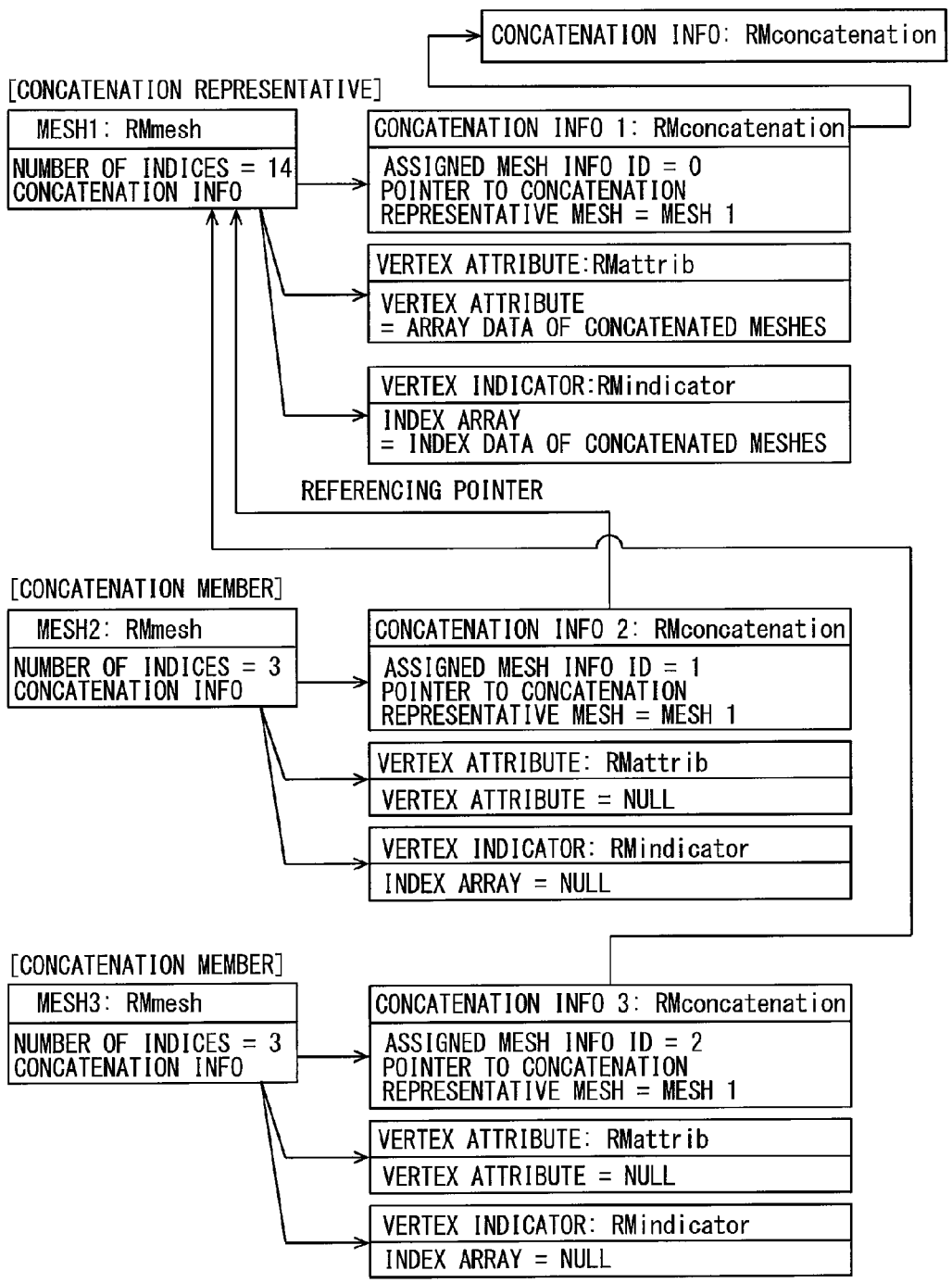
FIG. 6A is a diagram showing a flow of process according to a graphics pipeline.
Figure 6B:
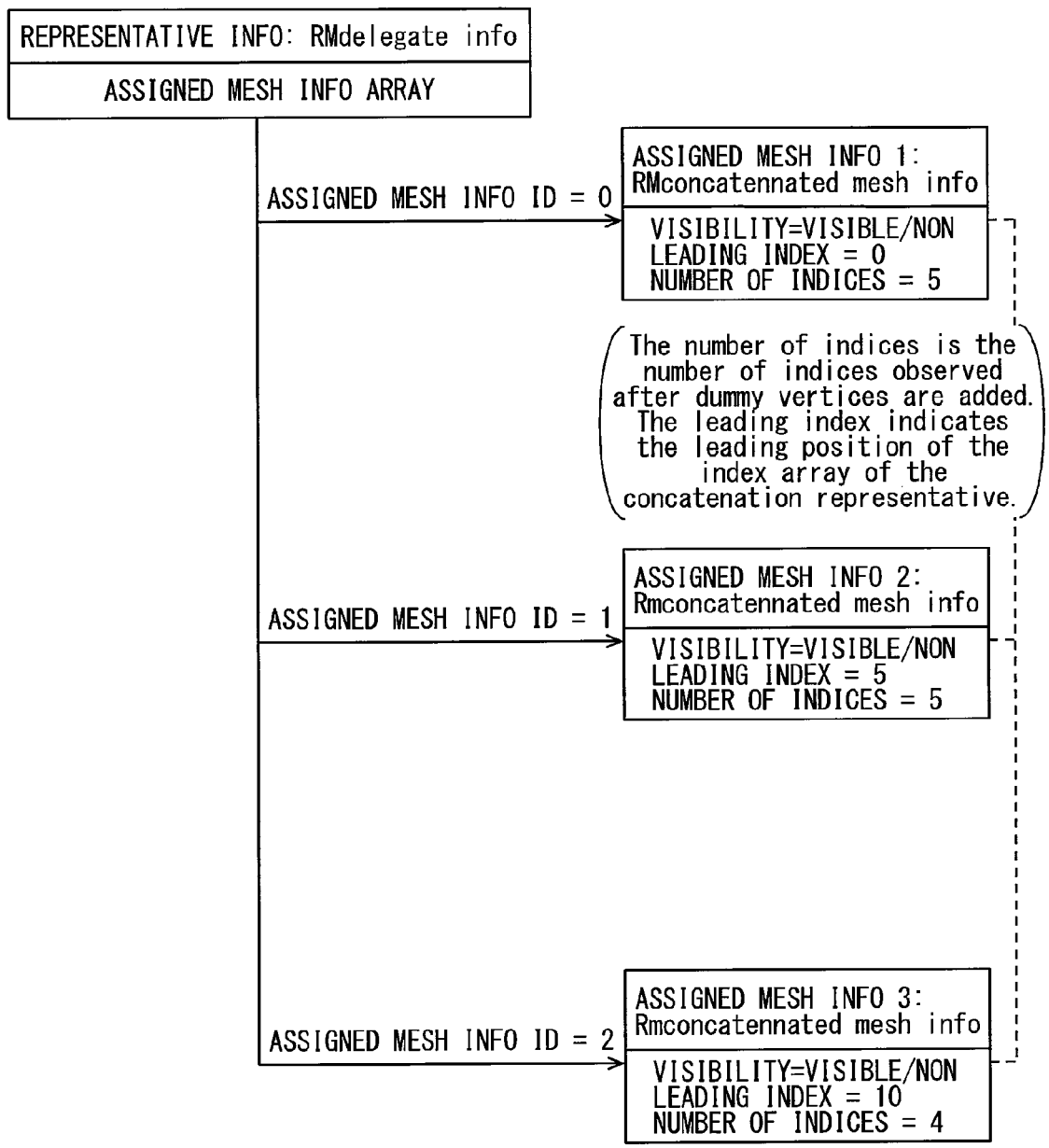
FIG. 6B is a diagram showing the flow of process according to the graphics pipeline.

Referring to FIG. 6A and FIG. 6B, a description will be made below. In FIG. 6A and FIG. 6B, a mesh 1 is of an object that appears first within a concatenation group, that is, a mesh of a concatenation representative. Meshes 2 and 3 are of objects that appear secondly and later within the concatenation group, that is, meshes of concatenation members (other than the concatenation representative). In this case, the number of indices (number of vertices) of the mesh 1 that is the concatenation representative is the number of indices to be attained after completion of concatenation (dummy vertices are taken account); the number of indices of each of the meshes 2 and 3 that are the concatenation members is the number of indices of each of the meshes. The meshes 2 and 3 that are the concatenation members each reference a pointer indicating the concatenation representative. Both the vertex attribute arrays and index arrays of the meshes 2 and 3 become "NULL." Namely, the CPU 2 concatenates the meshes 1 to 3 shown in FIG. 6A and FIG. 6B and performs vertex attribute transformation on three objects, which have the meshes 1 to 3 thereof concatenated, at a time.

After the CPU 2 thus performs vertex attribute transformation on a plurality of objects belonging to the concatenation group, the CPU 2 sets a flag signifying whether visibility is not "0" (S8). The CPU 2 then decides whether the object is the last one in the scene graph (S9). If a decision is made that the object is not the last one in the scene graph (S9: NO), control is returned to S1, and S1 to perform subsequent steps repeatedly. In contrast, if the CPU 2 decides that the object is the last one in the scene graph (S9: YES), the CPU 2 terminates a traverse process. When the mesh of an object does not meet a predefined concatenation condition, the CPU 2 decides that the object is not the one included in the concatenation group (S2: NO) and decides whether the object is the last one in the scene graph (S9).

Next, the CPU 2 initiates a rendering command transfer process to be performed on each of the objects on which vertex attribute transformation has been performed in advance (whose meshes are concatenated). The CPU 2 first references the information on an individual original mesh (S11), and decides whether the visibility of the original mesh is "0" or not (S12). If the CPU 2 decides that the visibility of the original mesh is not "0" (S12: NO), the CPU 2 copies the vertex to a tentative concatenation vertex array for rendering (S13), and decides whether the original mesh is the last one in the concatenation group (S14). If the CPU 2 decides that the visibility of the original mesh is "0" (S12: YES), the CPU 2 does not copy the vertex to the tentative concatenation vertex array for rendering, but decides whether the original mesh is the last one in the concatenation group (S14).

If the CPU 2 decides that the original mesh is the last one within the concatenation group (S14: YES), the CPU 2 transfers a rendering command, which instructs rendering of each of the objects on which vertex attribute transformation has been performed in advance, to the GPU 3 (S15). If the CPU 2 decides that the original mesh is not the last one within the concatenation group (S14: NO), the CPU 2 returns control to S11, and repeatedly performs S11 and subsequent steps. Note that even for an object on which the vertex attribute transformation has not been performed (whose mesh is not concatenated), the CPU 2 transfers a rendering command, which instructs rendering of the object on which the vertex attribute transformation has not been performed, to the GPU 3.

Figure 5:
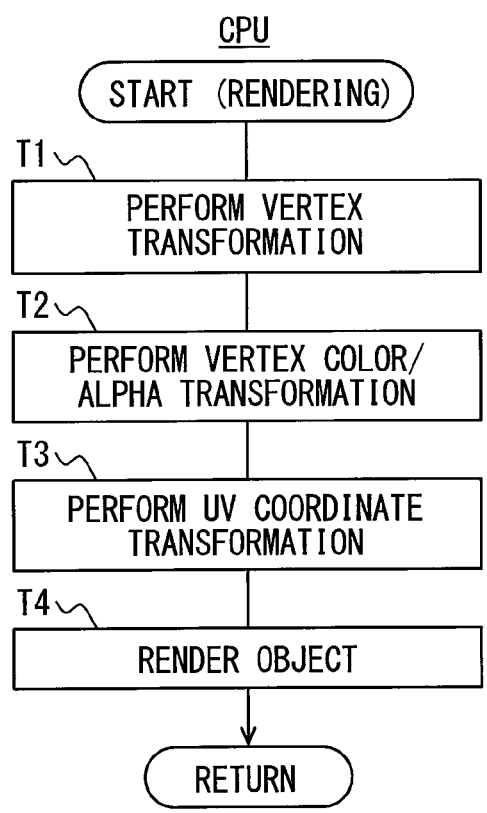
FIG. 5 is a flowchart describing a rendering process performed by a GPU.

The GPU 3 performs a rendering process as mentioned in FIG. 5. After initiating the rendering process, the GPU 3 performs a vertex attribute transformation that includes vertex transformation, vertex color/alpha transformation, and UV coordinate transformation (T1 to T3). The GPU 3 then renders objects on which the vertex attribute transformation has been performed (T4). Not that the GPU 3 performs the vertex attribute transformation on an object on which the CPU 2 has not performed the vertex attribute transformation, but does not perform any vertex attribute transformation on an object on which the CPU 2 has performed the vertex attribute transformation in advance.

Referring to FIG. 7, the foregoing series of processes will be explained below. A pipeline of a three-dimensional computer graphics includes a generation (G) stage to prepare data necessary for rendering, a traversal (T) stage to issue a rendering instruction, a transformation (X or Xformation) stage to perform vertex attribute transformation, a scan conversion (S) stage to calculate pixel values or brightness levels of pixels existent inside vertices of each of objects, and a display (D) stage to render the objects. The G stage and T stage are processed by the CPU 2, while the X stage, S stage, and D stage are processed by the GPU 3.

A description will be made of a case, for instance, where the CPU 2 performs the following: issuing an instruction that instructs rendering of a needle 11 under a condition of "a 90° turn and 50% opaqueness"; issuing an instruction that instructs rendering of a ring 12 under a condition of "100% opaqueness"; and issuing an instruction that instructs rendering of a picture 13 of the outside of a vehicle, which is imaged by a camera installed in the vehicle, under a condition of "100% opaqueness." The picture 13 is, for example, of a night view (a technology of catching a pedestrian or wild animal, which can hardly be identified under headlight, by irradiating near infrared rays) or of a back view (a technology of imaging behind a vehicle for parking assistance, and displaying the image). According to the existing technique, after issuing the instructions that instruct renderings of the respective objects, the CPU 2 sequentially transfers rendering commands that instruct rendering of the needle 11, rendering of the ring 12, and rendering of the picture 13 respectively, to the GPU 3. Upon receiving sequentially the rendering commands that instruct rendering of the needle 11, rendering of the ring 12, and rendering of the picture 13 respectively, the GPU 3 performs vertex attribute transformation on each of the objects, and renders each of the objects on which the vertex attribute transformation has been performed.

According to the technique of the present embodiment, when deciding that the needle 11 and ring 12 satisfy a concatenation condition, the CPU 2 concatenates the mesh of the needle 11 and the mesh of the ring 12, and performs in advance vertex attribute transformation on each of the needle 11 and ring 12. In short, the CPU 2 performs the vertex attribute transformation on the needle 11 and the vertex attribute transformation on the ring 12, and then regards the needle 11 and ring 12 as a single subject object. The CPU 2 then transfers a rendering command, which instructs rendering of the subject object, to the GPU 3.

That is, the existing technique causes the GPU 3 to perform vertex attribute transformation on each of the needle 11 and ring 12. In contrast, the technique of the present embodiment permits the CPU 2 to perform the vertex attribute transformation on each of the needle 11 and ring 12, regard the needle 11 and ring 12 as one object, and transfer the rendering command.

Figure 8:
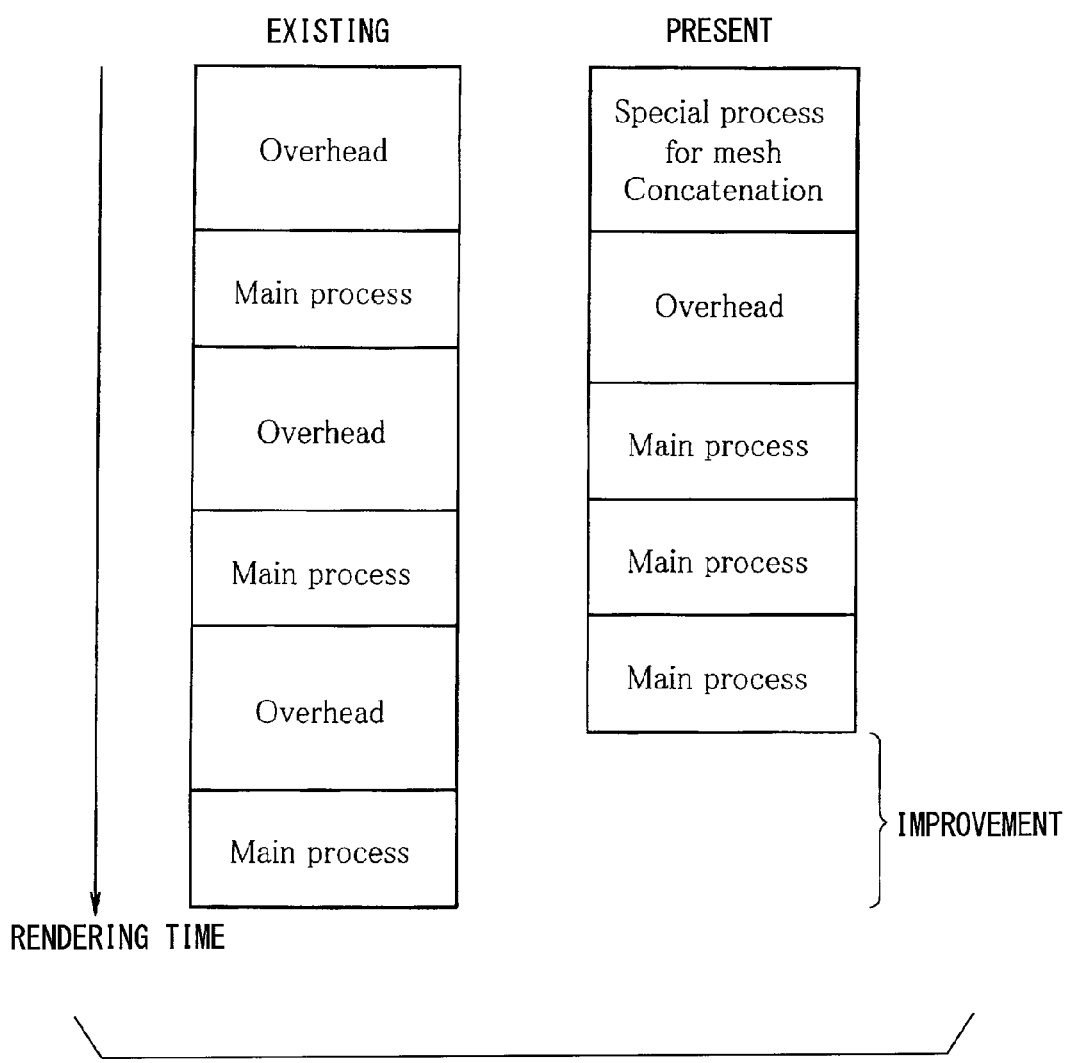
FIG. 8 is a diagram indicating a rendering time.

FIG. 8 shows a theoretical model for performance improvement realized by the technique of the present embodiment. According to the existing technique, every time the GPU 3 calls a rendering command from the CPU 2 for rendering one object, the GPU 3 requires some time (overhead). Every time the GPU 3 receives the rendering command, the GPU 3 performs vertex attribute transformation and renders the object (main process). In contrast, according to the technique of the present embodiment, as mentioned above, the CPU 2 performs, as a special process, concatenation of meshes of a plurality of objects which meet a concatenation condition (special process for mesh concatenation), and performs the vertex attribute transformation on the plurality of objects having the meshes thereof concatenated. FIG. 8 shows a case where the CPU 2 has concatenated meshes of three objects. The number of objects whose meshes are concatenated may be an arbitrary number of objects as long as the objects meet the concatenation condition.

The process time required for vertex attribute transformation performed according to the technique of the present embodiment depends on the number of vertices that are targets of calculation. Arithmetic expressions (1) and (2) presented below express the process time required for the vertex attribute transformation and deduced from the theoretical model. Herein, "oh" denotes an overhead time per an object, "obj" denotes the number of objects, and "v" denotes the number of vertices per an object. For brevity's sake, the "v" value shall remain constant for all objects within a scene graph. The overhead time shall take on a certain value, and a main process and a special process shall provide a linear function of "v." Assume that "m" denotes a slope of the linear function provided by the main process and "s" denotes a slope of the linear function provided by the special process. In other words, "m" denotes a process time per a vertex required within the main process, and "s" denotes a process time per a vertex required within the special process. The technique of the present embodiment adds two dummy vertices to all objects belonging to a concatenation group. One dummy vertex is added to an object having an even number of vertices. For brevity's sake, assuming that the number of vertices of each of all objects is even, (v+3) vertices have to be treated per an object.

Assuming that "t-before" denotes a process time required by the existing technique, and "t-after" denotes a process time required by the technique of the present embodiment, the process times can be expressed as follows:

$$t\text{-before}=(oh+m\times v)\times obj \quad (1)$$

$$t\text{-after}=oh+s(v+3)\times obj+m(v+3)\times obj \quad (2)$$

The number of all vertices of a model (expressed as v×obj) can be assumed to remain constant irrespective of whether the technique of the present embodiment is adapted. Arithmetic expressions (3) and (4) presented below can be deduced from the arithmetic expressions (1) and (2) respectively. As a result, the process times required by the existing technique and the technique of the present embodiment respectively can be expressed with linear functions. Namely, the process times can be expressed as follows:

$$t\text{-before}=oh\times obj+m(v\times obj) \quad (3)$$

$$t\text{-after}=3(s+m)\times obj+oh+(s+m)\times v\times obj \quad (4)$$

If the process time of the technique of the present embodiment is shorter than the process time of the existing technique, the technique of the present embodiment can be said to prove effective. In other words, if a condition satisfies an arithmetic expression (5) presented below, the technique of the present embodiment can be said to prove effective.

$$obj \geq (oh+s\times v\times obj)/\{oh-3(s+m)\} \quad (5)$$

Figure 9:
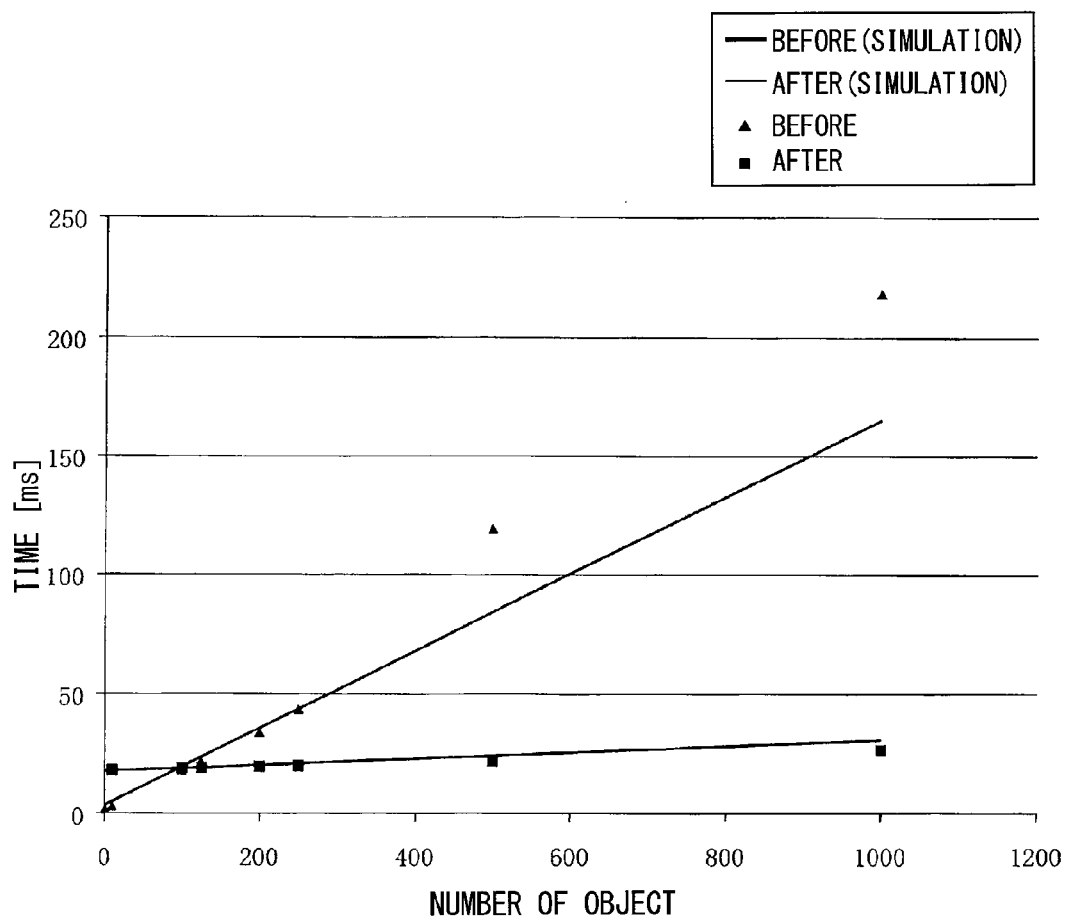
FIG. 9 is a diagram showing results of simulations and results of measurements of a load on the CPU.
Figure 10:
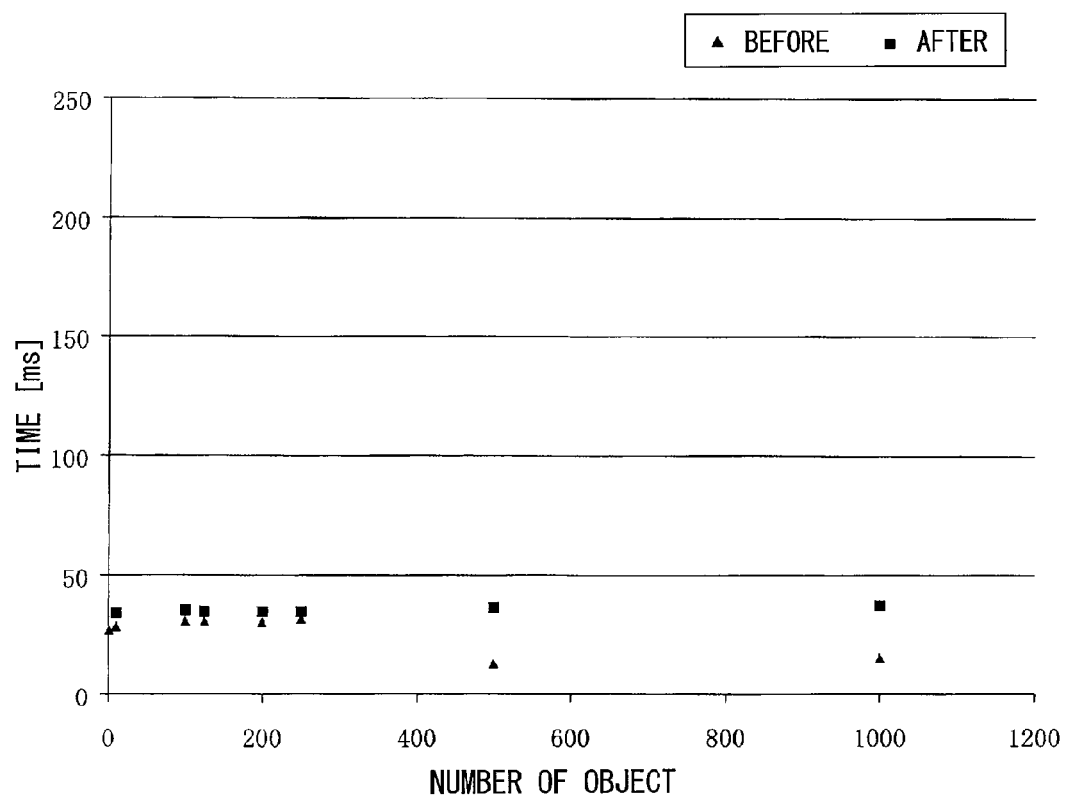
FIG. 10 is a diagram showing results of measurements of a load on the GPU.
Figure 11:
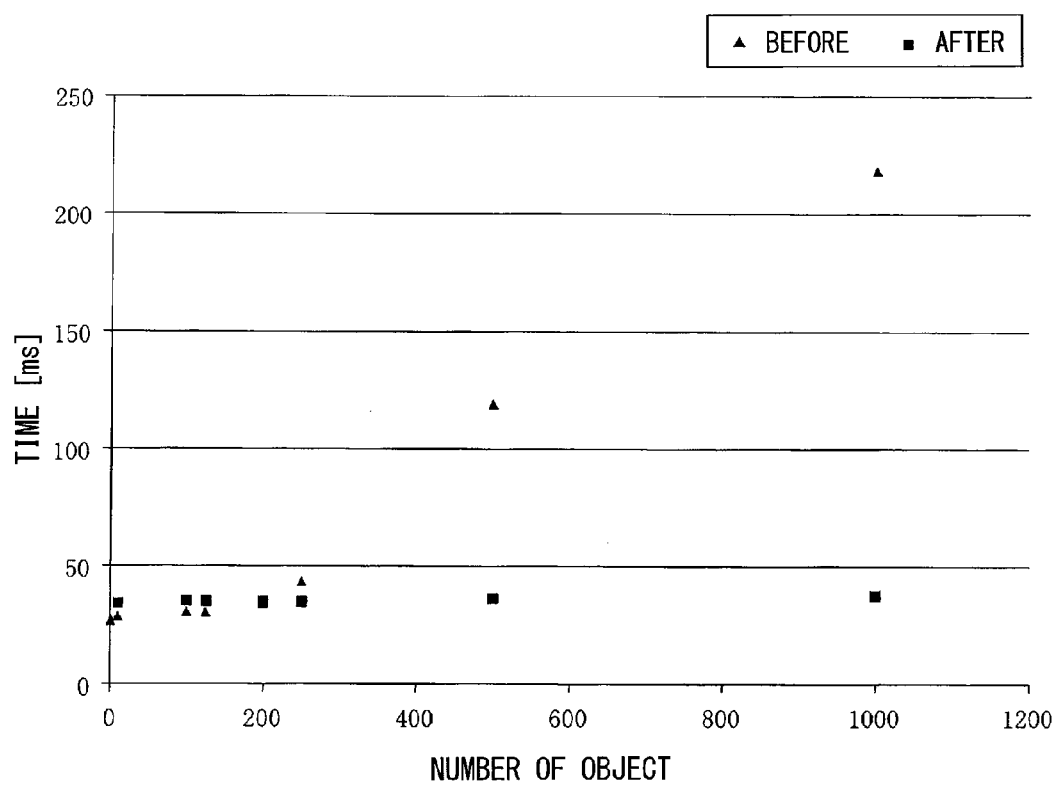
FIG. 11 is a diagram showing an actual process time.

The inventor et al. have measured the process time using an actual apparatus for verifying whether a performance characteristic agrees with the one obtained through the aforesaid theoretical analysis. A three-dimensional mode having "4000" vertices was prepared. As a measurement condition, the number of objects was set to "1," "10," "100," "125," "200," "250," "500," and "1000." An object structure was adjusted so that a product of the number of objects by the number of vertices per an object will remain constant. The process time was measured using each of the existing technique and the technique of the present embodiment, and loads imposed on the CPU 2 and GPU 3 respectively were measured. A longer time is an actual process time. For simulation using the arithmetic expressions (3) and (4), oh, m, and s were measured. In FIGS. 9 to 11 to be referenced later, "before" denotes a result of measurement conducted using the existing technique, and "after" denotes a result of measurement conducted using the technique of the present embodiment.

FIG. 9 shows results of simulations and results of measurements of the load on the CPU 2. The oh, m, and s values employed in the simulations are 0.16 [ms], 0.00077 [ms], and 0.0035 [ms], respectively. The values were measured using the actual apparatus. The results shown in FIG. 9 demonstrate that the theoretical model properly describes the measured performance. As far as the actual apparatus employed this time is concerned, if obj>97 is met according to the arithmetic expression (5), the technique of the present embodiment can be said to prove effective. The results of measurements demonstrate that when the number of objects exceeds approximately "100," the technique of the present embodiment proves effective.

The theoretical model does not taken account of the load on the GPU 3. FIG. 10 shows results of measurements of the load on the GPU 3. The characteristic of the load on the GPU 3 has to be further investigated. According to the results of the measurements conducted this time, the load caused by the existing technique is expressed as 30 [ms], and the load caused by the technique of the present embodiment is expressed as 35 [ms]. FIG. 11 shows an actual process time (longer one between the load on the CPU 2 and load on the GPU 3). The results shown in FIG. 11 demonstrate that when the number of objects exceeds "200," the technique of the present embodiment can be said to prove effective. Thus, when conditions for optimization such as the number of vertices and the number of objects are met, the technique of the present embodiment can be said to prove effective. As mentioned above, since a graphics meter includes lots of objects having relatively simple shapes (having a small number of vertices), the conditions for optimization can be relatively readily met.

An example of an advantageous effect to be exerted when the aforesaid technique of the present embodiment is adapted to a prototype will be described below. The prototype includes a Renesas SH7769, a ROM having a storage capacity of 128 M bytes, a DVGA (1280×480), and a 12.3-inch TFT display. Contents include four gauges (speedometer, tachometer, fuel gauge, and water temperature gauge), a telltale (warning lamp), a tab menu, and a driving assist system indicator. In the three-dimensional model, the number of objects is "154" and the number of vertices is "14960."

Owing to adaption of a plurality of optimization techniques, an upgrade expressed as 17.2 [ms] is expected but is unsatisfactory. Owing to the technique of the present embodiment, on this occasion, as shown in FIG. 12, 123 objects out of 154 objects can be classified into eight groups. A process time is expected to be reduced by a time (0.16 [ms]) of an overhead per an object. The advantageous effect of the technique of the present embodiment is expressed as 18.4 [ms] ((123−8)×0.16[ms]). In total, a reduction in the process time of 35.6 [ms] (17.2+18.4 [ms]) is expected. In order to confirm the advantageous effect, the process times of rendering required by the existing technique and the technique of the present embodiment respectively were measured. A display condition was a condition of the highest load permitted in the specifications. The results of the measurements shown in FIG. 13 demonstrate that a load on the CPU 2 can be said to be reduced without an adverse effect on the load on the GPU 3. A high frame rate is desired (especially for display of the needle of a tachometer that makes a quick motion) in order to realize smooth display. In consideration of a visual property of a human being, at least 30 [fps] is requested to be attained. In order to attain 30 [fps], the load on the CPU 2 has to be confined to 33 [ms] or less. The technique of the present embodiment can contribute to the attainment.

As described so far, according to the present embodiment, the CPU 2 in the three-dimensional image generation apparatus 1 concatenates meshes of a plurality of objects which meet a predefined concatenation condition, and performs in advance vertex attribute transformation on the plurality of objects having meshes thereof concatenated. The CPU 2 regards the plurality of objects, on which the vertex attribute transformation has been performed, as one object, and transfers a rendering command, which instructs rendering of the object, to the GPU 3. The GPU 3 renders the plurality of objects, which are regarded as the one object instructed with the rendering command received from the CPU 2, at a time. Accordingly, a time which the GPU 3 spends for an overhead of a function call issued with the rendering command can be suppressed, and a rendering speed can be raised. In this case, as many objects as possible need not be concatenated in a process of producing graphics data that is a fundament of a three-dimensional image. The process of producing the graphics data is left unaffected.

As for the concatenation condition, objects that reference the same material are included in the same concatenation group. Whether objects reference the same material is regarded as a criterion in order to concatenate meshes of the objects.

The present disclosure is not limited to the embodiment described so far, but can be modified or expanded as mentioned below.

The display unit 7 is not limited to a graphics meter of a vehicle but may be any other display unit installed in the vehicle. The constituent feature is not limited to the one that performs rendering on the display unit such as the graphics meter of a vehicle, but may be adapted to fields unrelated to the vehicle, such as, three-dimensional simulation, electronic public notices, or entertainment.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A three-dimensional image generation apparatus comprising:
   a control unit that transfers a first rendering command which instructs rendering of an object constituting a three-dimensional image;
   a rendering unit that, upon receiving the first rendering command from the control unit, performs vertex attribute transformation on an object of which rendering is instructed with the first rendering command and renders the object; and
   a concatenation section that concatenates meshes of a plurality of objects that meet a predefined concatenation condition,
   the control unit being further provided to
      perform in advance vertex attribute transformation on the plurality of objects of which meshes are concatenated by the concatenation section, and
      transfer a second rendering command,
         the second rendering command instructing rendering of the plurality of objects, on which the vertex attribute transformation has been performed, by regarding the plurality of objects as a single object,
   the rendering unit being further provided to render, at a time, the plurality of objects that are regarded as the single object, upon receiving the second rendering command from the control unit.

2. The three-dimensional image generation apparatus according to claim 1, wherein
   the concatenation section
      adopts as the concatenation condition a condition that the plurality of objects reference an identical material, and
      concatenates the meshes of the plurality of objects which meet the concatenation condition.

3. A three-dimensional image generation method to generate a three-dimensional image by causing a control unit to transfer a first rendering command instructing rendering of an object constituting a three-dimensional image to a rendering unit, and by causing the rendering unit to perform vertex attribute transformation on an object of which rendering is instructed with the first rendering command and render the object,
   the method comprising:
   concatenating meshes of a plurality of objects that meet a predefined concatenation condition;
   performing in advance vertex attribute transformation on the plurality of objects of which meshes have been concatenated; and
   transferring a second rendering command,
      the second rendering command instructing rendering of the plurality of objects, on which the vertex attribute transformation has been performed, by regarding the plurality of objects as a single object; and
   rendering, at a time, the plurality of objects that are regarded as the single object, upon receiving the second rendering command.

4. The three-dimensional image generation method according to claim 3, wherein:
   referencing an identical material is adopted as the concatenation condition; and
   the concatenating is performed when the meshes of the plurality of objects meet the concatenation condition.

* * * * *